United States Patent
Soncini et al.

Patent Number: 5,364,951
Date of Patent: Nov. 15, 1994

[54] NOVEL TUNGSTEN- OR MOLYBDENUM-BASED, SUPPORTED COMPOSITIONS, PROCESS FOR OBTAINING THEM AND THEIR PROPERTIES AS HETEROGENEOUS OXIDATION CATALYSTS

[75] Inventors: Paolo Soncini; Stefanio Bonsignore, both of Novara, Italy

[73] Assignee: Eniricerche S.P.A., Milan, Italy

[21] Appl. No.: 136,973

[22] Filed: Oct. 14, 1993

[30] Foreign Application Priority Data

Oct. 16, 1992 [IT] Italy .................. MI92 A 002376

[51] Int. Cl.$^5$ .................. C07F 11/00; C07C 51/16; C07C 51/235
[52] U.S. Cl. .......................... 556/9; 556/20; 556/30; 556/57; 562/512.2; 562/527; 562/531; 562/538
[58] Field of Search .................. 556/20, 9, 30, 57; 562/512.2, 527, 531, 538

[56] References Cited

FOREIGN PATENT DOCUMENTS 0275399 7/1988 European Pat. Off. .
1372189 10/1974 United Kingdom .
WO80/01692 8/2180 WIPO .

Primary Examiner—José G. Dees
Assistant Examiner—Porfirio Nazario-Gonzalez
Attorney, Agent, or Firm—Rogers & Wells

[57] ABSTRACT

Tungsten-(VI) or molybdenum-(VI)-based compounds which contain cationic groups from onium salts anchored on solid inorganic matrices having the general formula (I):

$$(P)\text{---}[(CH_2)_nQ^+RR'R'']_2[M_2O_{11}]^{2-} \qquad (I)$$

wherein:
(P) represents a solid matrix of inorganic type;
n represents an integer comprised within the range of from 1 to 20;
Q represents a pentavalent element belonging to Group VA of the Periodic System;
R, R' and R'', which may be the same or different from each other, represent a hydrogen atom or an alkyl $C_1C_{20}$ group;
M represents a tungsten or molybdenum atom.

26 Claims, No Drawings

NOVEL TUNGSTEN- OR MOLYBDENUM-BASED, SUPPORTED COMPOSITIONS, PROCESS FOR OBTAINING THEM AND THEIR PROPERTIES AS HETEROGENEOUS OXIDATION CATALYSTS

The present invention relates novel supported compounds based on tungsten-(VI) or molybdenum-(VI).

More particularly, the present invention relates to novel tungsten-(VI) or molybdenum-(VI)-based coumpounds which contain cationic groups from onium salts anchored onto solid inorganic matrices, to a process for preparing them and to the use of said compounds as heterogeneous catalysts in oxidation reactions.

When the compounds according to the present invention are used as heterogeneous catalysts in successive oxidation cycles, they can be easily recovered and re-used.

Compounds known as soluble inorganic catalysts, useful in the oxidation reactions in homogeneous phase, are widely studied and used in a large number of industrial processes, as disclosed, e.g., in Sheldon R. A.; Kochi J. K.: "Metal-catalyzed Oxidations of Organic Compounds", Academic Press, New York, 1981.

However many problems of physical-chemical, technological and financial character have to be copied with.

First of all, the cost of such catalysts is generally high and therefore the losses should be kept at a minimum. The catalyst recovery is hence of basic importance, but the recovery processes are generally complex and expensive.

Secondly, the contamination of the reaction product with catalyst residues is often detrimental to the stability of the same product and can cause serious toxicity problems.

Therefore, the having possibility of overcoming such drawbacks by converting the soluble homogeneous catalysts known from the prior art into insoluble derivatives capable of retaining the structure of the catalytic site and the same catalytic activity, would be very important from a practical view point.

From technical literature, a large number of examples are known of complexes of transition metals supported onto solid, insoluble matrices useful as heterogeneous catalysts in the oxidation reactions.

The above said complexes were studied and prepared in an effort aiming at obtaining both the activity and specificity of the homogeneous catalysts, and, simultaneously, the separation and recovery possible typical of heterogeneous catalysts.

Examples of methodologies which make it possible heterogeneous catalysts to be obtained are disclosed, e.g., in Hodge P., Sherrington D. C.: "Polymer-Supported Reactions in Organic Synthesis", John Wiley & Sons, Chichester, 1980; . Ford W. T.: "Polymeric Reagents and Catalysts", American Chemical Society Symposium Series, 1986; and in "Pure and Applied Chemistry", vol. 60, page 401, 1988.

It is furthermore known that tungsten-(VI) and molybdenum-(VI) form complexes which display a high oxidizing activity towards several organic substrates as, e.g., reported in Sheldon R. A., Kochi J. K.: "Metal-catalyzed Oxidation Of Organic Compounds", Academic Press, New York, 1981. However, only an extremely small number exists of examples of such a type of complexes as heterogeneous phases.

In Italian patent application No. 24,154 A/82 in the name of Montedison S.p.A., compounds of general formula:

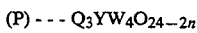

are disclosed, in which:
(P) represents a solid organic matrix;
Y represents phosphorus; and
Q represents an onium salt cation.

The above mentioned phosphorus and tungsten-(VI) peroxo compounds, so anchored to the matrix (P), can be used as catalysts in olefin epoxidation processes using hydrogen peroxide as the primary oxidizer agent. The activity of these supported catalysts, which are used according to the three-phase technique: solid phase (catalyst)/aqueous liquid phase ($H_2O_2$)/organic phase (organic solvent immiscible with water), is anyway limited to the oxidation of water insoluble substrates.

From technical literature, the possibility is furthermore known of supporting peroxotungstate ("Journal of Catalysis", Vol. 19, page 256, 1970) and peroxomolybdate ("Polymeric Material Science Engineering", Vol. 64, page 355, 1991) on onium salts containing organic macromolecules of polystyrene type. Unfortunately, these compounds proved to be active as catalysts exclusively in the epoxidation of olefins using hydrogen peroxide as the primary oxidizer. Furthermore, when these heterogeneous systems are used in the oxidation reactions, a further problem arises, relevant to the progressive degradation of the organic polymeric matrix and, therefore, to the impossibility of regenerating the catalytic species.

The present Applicants have found now novel supported compounds based on tungsten-(VI) or molybdenum-(VI), which can be used as heterogeneous catalysts in oxidation reactions using hydrogen peroxide as the primary oxidizing agent, capable of overcoming the drawbacks which affect the prior art, because they can be used in a double phase, aqueous/solid system.

Therefore, the subject-matter of the present invention are the tungsten-(VI) or molybdenum-(VI)-based compounds which contain cationic groups from onium salts anchored onto solid inorganic matrices having the general formula (I):

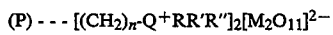

wherein:
(P) represents a solid matrix of inorganic type;
n represents an integer comprised within the range of from 1 to 20;
Q represents a pentavalent element belonging to Group VA of the Periodic System;
R, R' and R'', which may be the same or different from each other, represent a hydrogen atom or an alkyl $C_1$–$C_{20}$ group;
M represents a tungsten or molybdenum atom.

Inasmuch as they are supported on inorganic matrices with physical-chemical characteristic similar to the aqueous phase, the compounds according to the present invention are suitable for oxidizing soluble substrates in said phase whilst the compounds disclosed in Italian patent application No. 24,154 A/82, by being supported on organic matrices, are affine to the organic phase in which the substrate to be oxidized is. Furthermore, the immobilized anions have very different lipophilic characteristics and, in particular, anion $[YW_4O_{24-2n}]^{3-}$ is much more lipophilic than anion $[M_2O_{11}]^{2-}$, supporting which is the subject matter of the present invention. Thanks to their insolubility, the compounds according to the present invention are easily separated from the reaction medium and furthermore, thanks to the stability of their solid carrier, are easily regenerated for being re-used.

The solid matrix of inorganic type (P) can be selected from silica either prepared according to the traditional techniques or prepared via sol-gel, alumina, titanium silicalite, zeolite, bauxite, pumex, clay, fossil meal, titania, zirconia, zinc oxide or tin oxide, oxides, carbonates, sulfates, phosphates or other inorganic derivatives of alkaline-earth metals, and so forth.

The pentavalent element Q can be selected from nitrogen, phosphorus, arsenic or antimony.

Preferred compounds of general formula (I) according to the present invention are those in which (P) is silica prepared either according to the traditional techniques or via sol-gel or alumina, n is comprised within the range of from 1 to 6, Q is nitrogen or phosphorus, R, R' and R" are a hydrogen atom or a $C_1$-$C_{12}$ alkyl radical, M is tungsten or molybdenum.

The amount of metal present in the compounds of general formula (I) depends of the amount of onium salt bound to the solid inorganic matrix.

In general, values are regarded as effective, which are comprised within the range of from 0.003 to 2.7 mmols, preferably of from 0.03 to 1.7 mmols of tungsten-(VI) or molybdenum-(VI) per each gram of supported catalyst. A further object of the present invenction is a process for synthesizing the compounds of general formula (I).

The inorganic compounds of general formula (I) can be obtained by means of a process which comprises causing an aqueous phase containing hydrogen peroxide and a tungsten-(VI) or molybdenum-(VI) derivative to react with an onium salt bound to an inorganic solid matrix, at room pressure and at a temperature comprised within the range of from 0° C. to 100° C., preferably of from 20° C. to 80° C.

In general, in the process according to the present invention, a derivative of the metal can be used, even with a lower valency state than (VI), or the same metal in its elemental state, provided that said derivative, or elemental metal, under the expected reaction conditions, may give rise "in situ" to an oxygen containing derivative of the metal in the valency state (VI). Examples of useable derivatives of tungsten-(VI) or molybdenum-(VI) are, e.g., the metal in its elemental state, the acids or their salts, the oxides, the mixed oxides or oxide-salts, the oxyacids, the naphthenates, the acetylacetonates, the carbonylic derivatives, the sulfides, the chlorides, and so forth.

Examples of preferred derivatives of tungsten-(VI) or molybdenum-(VI) for the purposes of the present invention are the oxygen containing derivatives of the relevant metal, such as tungstic or molybdic acid, or their corresponding alkali metal salts.

Examples of the onium salts which can be used in the process according to the present invention are those have the general formula (II):

  (II)

wherein:
(P), n, Q, R, R' and R" have the same meaning as disclosed hereinabove;

$X^-$ represents a stable inorganic anion such as $Cl^-$, $HSO_4^-$, $NO_3^-$ and so forth.

Examples of preferred onium salts for the purposes of the present invention are (3-aminopropyl)silica gel hydrochloride both prepared according to the traditional techniques (compound IA), and via sol-gel (compound IB), (3-aminopropyl)alumina hydrochloride, [3-(tributylammonio)propyl]silica gel chloride, [3-(tributylphosphonio)propyl]silica gel chloride.

The onium salts of general formula (II) are easily available on the market, or can be prepared according to techniques known in the art, such as, e.g., described in "Journal of American Chemical Society", Vol. 101, page 6606, 1979.

In the above disclosed process, from 2 to 10 mols, preferably from 2.5 to 6 mols of hydrogen peroxide is used per each mol of derivative of tungsten-(VI) or molybdenum-(VI).

In the event when derivatives of tungsten or molybdenum with lower valency than (VI) are used, to the above said amounts of hydrogen peroxide, also the necessary amount to bring the metal into its oxidation state (VI) should be added.

The onium salts with general formula (II) are usually employed in amounts which correspond to a molar ratio of $Q^+$/metal comprised within the range of from 3 to 0.1, preferably of from 2 to 0.25.

The compositions with general formula (I) can be obtained according to another process which comprises the reaction between a hydrogen peroxide containing aqueous phase and a compound with general formula (III):

  (III)

wherein (P), n, Q, R, R', R" and M have each the same meaning as disclosed hereinabove. The reaction is carried out under atmospheric pressure and at a temperature comprised within the range of from 0° C. to 100° C., preferably of from 20° C. to 80° C.

The compounds of general formula (III) are prepared by causing a salt of tungstic or molybdic acid such as, e.g., sodium tungstate or ammonium molybdate, to react with a supported onium salt of general formula (II). The reaction is carried out under atmospheric pressure and at a temperature comprised within the range of from 0° C. to 100° C., preferably of from 20° C. to 80° C.

According to a preferred embodiment, the compounds of general formula (I) are obtained as follows.

An oxygen containing derivative of tungsten-(VI) or molybdenum-(VI) such as, e.g., tungstic or molybdic acid, in aqueous solution or suspension, is treated, with stirring, with an aqueous solution of hydrogen peroxide in the desired ratio, and at a temperature comprised within the range of from 20° C. to approximately 80° C. and atmospheric pressure. Subsequently, with stirring, a supported onium salt of general formula (II), such as, e.g., (3-aminopropyl)silica gel hydrochloride, is added, preferably at room temperature, and the resulting double phase mixture is continued to be stirred for a further 15-30 minutes. The resulting solid phase is filtered off, is washed with water and is dried in oven at 80° C. for some hours, with the compound of general formula (I) being thus obtained in solid form.

The compounds of general formula (I) according to the present invention exist in the physical state of solids insoluble in water and organic solvents.

Thanks to their characteristics, such compounds display interesting applications.

In fact, a further aspect of the present invention relates to the use of the above said compounds as heterogeneous catalysts in the reactions of oxidation of organic substrates, with hydrogen peroxide being used as a primary oxidizer agent.

The oxidation reactions are carried out in a two-phase aqueous/solid system. The aqueous solution is constituted by hydrogen peroxide and an aqueous solution of the substrate to be oxidized and the solid phase is constituted by the catalyst supported by the inorganic solid matrix.

The use of the compounds of general formula (I) as a heterogeneous oxidation catalysts make it possible for diluted hydrogen peroxide to be used, even at a concentration which may be lower than 10% by volume, but which is generally comprised within the range of from 10% to 40% by weight/volume, with a high conversion of hydrogen peroxide being obtained together with a high selectivity to the end product.

In the case of the oxidation reactions with hydrogen peroxide, the compounds of general formula (I) can be prepared in situ, by starting from the corresponding compound of general formula (III).

The compounds of general formula (I) according to the present invention are particularly active as catalysts in the reactions of oxidation of water soluble organic compounds such as, for example, alcohols, diols, aldehydes, ketones, and so forth.

The temperature and pressure of the oxidation reaction depend on the nature and reactivity of the substrate to be oxidized, on the stability of hydrogen peroxide and of the catalyst used.

Temperatures comprised within the range of from 0° C. to 120° C. and pressures comprised within the range of from atmospheric pressure up to 100 atm should be regarded as usually applicable.

The oxidation reaction time depends on the nature of the catalyst and on the type of the substrate. In general, reaction times comprised within the range of from 15 minutes to 24 hours are enough in order to bring the reaction to completeness.

The compounds of general formula (I) are used as catalysts in the oxidation reaction disclosed hereinabove in amounts comprised within the range of from 0.0001 to 1 gram/atom of metal per 1 mol of hydrogen peroxide, preferably of from 0.001 to 0.2 gram/atom of metal per 1 mol of hydrogen peroxide.

The amount of hydrogen peroxide to be used depends on the substrate. In general, a molar excess of 10% relatively to the necessary stoichiometric amount is used.

Thanks to their insolubility, the compounds of general formula (I), when used as catalysts, can be easily separated from the reaction mixture by simply filtering the two-phase mixture.

According to a preferred embodiment, when the compounds of general formula (I) are used as catalysts, the oxidation reaction is carried out as follows.

An aqueous solution of substrate to be oxidized and the compounds of general formula (I), in the preselected molar ratios, are treated, with stirring, with an aqueous solution of hydrogen peroxide, at a temperature comprised within the range of from 20° C. to approximately 100° C. The stirring of the resulting two-phase mixture is continued for a time comprised within the range of from 15 minutes to 24 hours.

The two-phase mixture is subsequently cooled and the compound of general formula (I), insoluble, is filtered off, is washed with water and/or other suitable solvents such as, e.g., methanol, ethyl ether, methylene chloride, toluene, and so on, which dissolve the reactant substrate and the resulting reaction product.

The so separated compound of general formula (I) can be used again, in an analogous way, in subsequent oxidation cycles.

Although when the compounds of general formula (I) are re-used many times as catalysts, a progressive decrease in the amount of present metal may be observed, the original catalytic species can anyway be regenerated by simply treating the exhausted catalyst with an aqueous solution containing hydrogen peroxide and a suitable derivative of the metal, as previously disclosed.

From the data reported in Table 1, a considerable loss of metal can be observed at the end of the first oxidation reaction (the first cycle), whilst, after the subsequent cycles, said metal loss is constant and much lower.

After the first regeneration, the catalyst does not absorb again the same percent content of metal which it initially contained, but a lower amount. This is probably due to a degradation of a portion of the chains to which the onium salt is linked. However, a degradation does not occur any longer during the subsequent cycles. In fact, after the second regeneration, the catalyst absorbs again the same amount of metal which it contained after the first regeneration.

The regeneration of the compound of general formula (I) is carried out in the following way.

The compound of general formula (I), recovered by filtration and washed, after its use as the catalyst in a plurality of oxidation cycles (in general, 3-4 cycles), is treated, with stirring, with a solution of concentrated HCl at a temperature of about 80° C. Stirring the resulting two-phase mixture is continued for 3-6 hours.

The two-phase mixture is subsequently cooled down to room temperature and the compound of general formula (I), insoluble, is filtered off and is washed with water until neutral.

The resulting solid material is then treated, with stirring, with an oxygen containing derivative of tungsten (VI) or molybdenum (VI) such as, e.g., tungstic or molybdic acid, in aqueous solution or suspension, and with an aqueous solution of hydrogen peroxide at a temperature comprised within the range of from 20° C. to about 80° C. The resulting two-phase mixture is continued to be stirred for a further 15-30 minutes.

The solid phase is subsequently filtered off and is washed with water until neutral. The so regenerated solid compound of general formula (I) is ready for use as catalyst in further oxidation cycles.

In order to facilitate the reading and interpretation of the following Tables and examples, some of compounds of general formula (I) and (III) according to the present invention are explicitly explained in the following:

| | |
|---|---|
| Silica - - - $[(CH_2)_3N^+H_3]_2[W_2O_{11}]^{2-}$ | (IA) |
| Silica - - - $[(CH_2)_3N^+H_3]_2[W_2O_{11}]^{2-}$ (via sol gel) | (IB) |
| Silica - - - $[(CH_2)_3N^+H_3]_2[Mo_2O_{11}]^{2-}$ | (IC) |
| Silica - - - $[(CH_2)_3N^+But_3]_2[W_2O_{11}]^{2-}$ | (ID) |
| Silica - - - $[(CH_2)_3P^+But_3]_2[W_2O_{11}]^{2-}$ | (IE) |

Silica - - - [(CH$_2$)$_3$N$^+$H$_3$]$_2$[WO$_4$]$^{2-}$      (IIIA)

In Table 1 the values are reported of the percent yield values, and of the amounts of metal present in the catalyst, observed when the oxidation of 1,2-phenylethanediol substrate was carried out with hydrogen peroxide at 30% by weight/volume, at a temperature of 90° C., during a reaction time of 7 hours, using the compound (IA) as heterogeneous catalyst.

In Table 2 the values are reported of the percent yield values obtained when the oxidation of 1,2-phenylethanediol substrate was carried out with hydrogen peroxide at 30% by weight/volume at a temperature of 90° C. for a 7-hour time, with the compounds (IA), (IB), (IC), (ID), (IE) and (IIIA) being used as heterogeneous catalysts.

In Table 3, the values are reported of the percent yield values obtained when the oxidation of some organic substrates was carried out with hydrogen peroxide at 30% by weight/volume, at a temperature of 90° C., during a 24-hour time, with the compound (IA) being used as the heterogeneous catalyst.

The following experimental examples are reported for illustrative purposes and in no way should be construed as being limitative of the present invention.

EXAMPLE 1

Preparation of compound (IA)

Silica - - - [(CH$_2$)$_3$N$^+$H$_3$]$_2$[W$_2$O$_{11}$]$^{2-}$      (IA)

2.59 g of tungstic acid (H$_2$WO$_4$) (10.3 mmol) and 7 ml of hydrogen peroxide (H$_2$O$_2$) at 20% by weight/volume (about 41 mmol) are charged to a beaker.

The suspension of tungstic acid is kept stirred at about 60° C. until said acid is completely dissolved.

After cooling, to the resulting colourless solution, 10 g of (3-aminopropyl)silica gel hydrochloride (approximately 10 mmol of Cl$^-$) is added. After a further 30-minute stirring, the solid phase is filtered off and is washed with water.

After oven drying at 80° C. for 5 hours, about 11.2 g of a solid compound with pale yellow colour is obtained.

Elemental analysis: C: 3.19; H: 0.99; N: 0.71; Si: 35.5; W: 9.3.

EXAMPLE 2

Preparation of compound (IB)

Silica - - - [(CH$_2$)$_3$N$^+$H$_3$]$_2$[W$_2$O$_{11}$]$^{2-}$(via sol gel)      (IB)

1.5 g of tungstic acid (H$_2$WO$_4$) (6 mmol) and 6.8 ml of hydrogen peroxide (H$_2$O$_2$) at 10% by weight/volume (about 20 mmol) are charged to a beaker.

The suspension of tungstic acid is kept stirred at about 60° C. until said acid is completely dissolved.

After cooling, to the resulting colourless solution, 2 g of (3-aminopropyl)silica gel hydrochloride obtained via sol gel (approximately 10.4 mmol of Cl$^-$) is added. After a further 30-minute stirring, the solid phase is filtered off and is washed with water.

After oven drying at 80° C. for 5 hours, about 2.3 g of a solid compound with pale yellow colour is obtained.

Elemental analysis: C: 6.55; H: 2.18; N: 2.24; Si: 24.5; W: 17.9.

EXAMPLE 3

Preparation of compound (IIIA)

Silica - - - [(CH$_2$)$_3$N$^+$H$_3$]$_2$[WO$_4$]$^{2-}$      (IIIA)

3.96 g of sodium tungstate dihydrate (Na$_2$WO$_4$.2H$_2$O) (12 mmol) in 50 ml of water are charged to a beaker.

To the resulting solution, 6 g of (3-aminopropyl)silica gel hydrochloride (about 6 mmol of Cl$^-$) is added. After a further 30-minute stirring, the solid phase is filtered off and is washed with water.

After over drying at 80° C. for 5 hours, approximately 6.4 g of a solid compound of pale yellow colour is obtained.

Elemental analysis: C: 3.48; H: 0.88; N: 1.23; Si: 36.9; W: 7.8.

EXAMPLE 4

Preparation of compound (IC)

Silica - - - [(CH$_2$)$_3$N$^+$H$_3$]$_2$[Mo$_2$O$_{11}$]$^{2-}$      (IC)

This preparation is carried out by operating according to as shown in Example 1, using 2 g of molybdic acid (H$_2$MoO$_4$) (about 10.4 mmol) instead of tungstic acid.

At the end, about 10.5 g of a solid compound with green colour is obtained.

Elemental analysis: C: 3.96; H: 0.9; N: 1.14; Si: 36; Mo: 8.4.

EXAMPLE 5

Preparation of compound (ID)

Silica - - - [(CH$_2$)$_3$N$^+$But$_3$]$_2$[W$_2$O$_{11}$]$^{2-}$      (ID)

This preparation is carried out by operating according to as shown in Example 1, using 10 g of [3-(tributylammonium)propyl]silica gel chloride (about 9.6 mmol of N$^+$) instead of (3-aminopropyl) silica gel hydrochloride.

At the end, about 10.5 g of a solid compound with white colour is obtained.

Elemental analysis: C: 5.32; H: 1.12; N: 0.32; Si: 37.9; W: 4.45.

EXAMPLE 6

Preparation of compound (IE)

Silica - - - [(CH$_2$)$_3$P$^+$But$_3$]$_2$[W$_2$O$_{11}$]$^{2-}$      (IE)

This preparation is carried out by operating according to as shown in Example. 1, using 10 g of [3-(tributylphosphonio)propyl]silica gel chloride (about 9.6 mmol of P$^+$) instead of (3-aminopropyl) silica gel hydrochloride.

At the end, about 10.7 g of a solid compound with white colour is obtained.

Elemental analysis: C: 6.43; H: 1.23; P: 1.02; Si: 35,7; W: 5.13.

EXAMPLE 7

Oxidation of 1,2-phenylethanediol into benzoic acid, using the compound (IA)

0.53 liters of hydrogen peroxide at 30% w/v (4.7 mol), 17.4 g of compound (IA) (equivalent to 8.8 mmol of tungsten) and 124.2 g of 1,2-phenylethanediol (0.9 mol) are charged to a four-necked reactor of one liter of capacity, equipped with blade stirrer, thermometer and condenser.

The reaction mixture is vigorously stirred at room temperature for 4 hours and is subsequently heated up to 90° C. and is kept stirred 20 hours at this temperature.

The solid compound (IA) is then separated from the reaction mixture by filtering on glass frit filter and is carefully washed with hot water and methanol.

The reaction products are extracted from the filtrate with ethyl ether.

In the aqueous phase 0.17 mol of unreacted hydrogen peroxide is detected by iodometry. The organic phase is diluted with water and its pH value is adjusted at about 8 by adding a 1N solution of sodium hydroxide. The aqueous phase is separated acid is then acidified with concentrated hydrocloric acid. It is then extracted with ethyl ether and from the organic phase, which is separated and subsequently evaporated, 87.84 g of benzoic acid is obtained (calculated yield relatively to the amount of 1,2-phenylethanediol: 80%).

EXAMPLE 8

Oxidation of 1,2-cyclohexanediol into adipic acid, using the compound (IA)

63.5 of hydrogen peroxide at 30% w/v (0.56 mol), 4.1 g of compound (IA) (equivalent to 2.1 mmol of tungsten) and 12.1 g of 1,2-cyclohexanediol (0.1 mol) are charged to a four-necked reactor of 0.25 liters of capacity, equipped with blade stirrer, thermometer and condenser.

The reaction mixture is vigorously stirred at room temperature for 4 hours and subsequently is heated up to 90° C. and is kept stirred 20 hours at this temperature.

The solid compound (IA) is then separated from the reaction mixture by filtering on a glass frit filter and is carefully washed with hot water and benzene.

From the aqueous phase separated from the solution and further washed with benzene, 11.4 g of adipic acid is obtained by crystallization when cold (calculated yield relatively to the amount of 1,2-cyclohexanediol: 75%).

EXAMPLE 9

Oxidation of cyclohexanol into cyclohexanone, using the compound (IA)

7 ml of hydrogen peroxide at 30% w/v (60 mmol), 1.4 g of compound (IA) (equivalent to 0.7 mmol of tungsten) and 5 g of cyclohexanol (50 mmols) are charged to a four-necked reactor of 0.25 liters of capacity, equipped with blade stirrer, thermometer and condenser.

The reaction mixture is vigorously stirred at 90° C. for 90 minutes.

The solid-compound (IA) is then separated from the reaction mixture by filtering on a glass frit filter and is carefully washed with hot water and ethyl ether.

The filtrate is then extracted with ethyl ether and from the organic phase, separated and subsequently evaporated, 4.7 g of cyclohexanone is obtained (calculated yield relatively to the amount of cyclohexanol: 97%).

EXAMPLE 10

Oxidation of 1-propanol into propionic acid, using the compound (IA)

23 ml of hydrogen peroxide at 30% w/v (200 mmol), 1.6 g of compound (IA) (equivalent to 0.8 mmol of tungsten) and 3 g of 1-propanol (50 mmols) are charged to a four-necked reactor of 0.25 liters of capacity, equipped with blade stirrer, thermometer and condenser.

The reaction mixture is vigorously stirred at 90° C. for 24 hours.

The solid compound (IA) is then separated from the reaction mixture by filtering on a glass frit filter and is carefully washed with hot water and ethyl ether.

After saturating the solution with sodium chloride, the filtrate is extracted with ethyl alcohol and from the organic phase, separated and subsequently evaporated, 3.1 g of propionic acid is obtained (calculated yield relatively to the amount of 1-propanol: 85%).

EXAMPLE 11

Regeneration of coumpound (IA)

10 g of compound (IA), recovered and washed after the oxidation reactions and 50 ml of a concentrated solution of hydrochloric acid are charged to a flask of 250 ml. The resulting two-phase mixture is heated up to 80° C. and is kept stirred 3-6 hours at this temperature.

Then, the mixture is cooled down to room temperature and the compound (IA), insoluble, is filtered off on a glass frit filter and is washed with water until neutral. The resulting solid is treated with tungstic acid and hydrogen peroxide, by operating according to the same modalities as disclosed in Example 1.

About 10.5 g of a solid compound with pale yellow colour is obtained.

Elemental analysis: C: 2.68; H: 0.81; N: 0.45; Si: 39; W: 5.9.

TABLE 1

Oxidation of 1,2-phenylethanediol (substrate) in order to yield benzoic acid (product), with $H_2O_2$ at 30% w/v, t = 7 h, T = 90° C., using the compound (IA) as the heterogeneous catalyst.

| Cycle | mmol of W | mmol of substrate | mmol of $H_2O_2$ | Yield %[1] | % W |
|---|---|---|---|---|---|
| — | | | | | 9.3 |
| 1 | 2.49 | 45 | 234 | 75 | 3.5 |
| 2 | 0.75 | 40 | 210 | 58 | 1.5 |
| 3 | 0.27 | 30 | 156 | 37 | 0.7 |
| 1st regeneration | | | | | 5.9 |
| 4 | 1.59 | 40 | 208 | 70 | 3.6 |
| 5 | 0.88 | 36 | 187 | 50 | 2.8 |
| 2nd regeneration | | | | | 5.2 |
| 6 | 1.31 | 35 | 182 | 73 | 3.0 |
| 7 | 0.62 | 31 | 161 | 54 | 2.2 |

[1]Yield calculated relatively to the isolated amount of benzoic acid.

TABLE 2

Oxidation of 1,2-phenylethanediol (substrate) in order to yield benzoic acid (product), with $H_2O_2$ at 30% w/v, t = 7 h, T = 90° C., using the compounds (IA), (IB), (IC), (ID), (IE) and (IIIA) as heterogeneous catalysts.

| Catalyst | mmol of metal | mmol of substrate | mmol of $H_2O_2$ | Yield %[1] |
|---|---|---|---|---|
| (IA) | 4.5 | 50 | 260 | 81 |

TABLE 2-continued

Oxidation of 1,2-phenylethanediol (substrate) in order to yield benzoic acid (product), with $H_2O_2$ at 30% w/v, t = 7 h, T = 90° C., using the compounds (IA), (IB), (IC), (ID), (IE) and (IIIA) as heterogeneous catalysts.

| Catalyst | mmol of metal | mmol of substrate | mmol of $H_2O_2$ | Yield %[1] |
|---|---|---|---|---|
| (IB) | 1.7 | 35 | 182 | 81 |
| (IC) | 5.3 | 50 | 260 | 61 |
| (ID) | 2.1 | 45 | 260 | 83 |
| (IE) | 2.4 | 45 | 260 | 82 |
| (IIIA) | 2.6 | 50 | 260 | 78 |

[1]Yield calculated relatively to the isolated amount of benzoic acid.

TABLE 3

Oxidation of organic substrates with $H_2O_2$ at 30% w/v, t = 24 h, T = 90° C., using the compound (IA) as the heterogeneous catalyst.

| Substrate (mmol) | mmol of W | mmol of $H_2O_2$ | Yield %[1] | Product |
|---|---|---|---|---|
| 1,2-phenylethanediol (900) | 8.8 | 4680 | 80 | benzoic acid |
| 1,2-cyclohexanediol (104) | 2.1 | 560 | 75 | adipic acid |
| cyclohexanol (50) | 0.7 | 60 | 97[2] | cyclohexanone |
| 1-propanol (50) | 0.8 | 100 | 50 | propionic acid |
| 1-propanol (50) | 0.8 | 200 | 85 | propionic acid |

[1]Calculated yield relatively to isolated acid amount.
[2]t = 90 minutes.

We claim:

1. Supported tungsten-(VI)- or molybdenum-(VI)-based compound which contain cationic groups from onium salts anchored onto solid inorganic matrices having the general formula (I):

where
(P) represents a solid inorganic matrix;
n is 1 to 20;
Q represents a pentavalent element from Group VA of the Periodic Table;
R, R' and R'', which may be the same or different, represent a hydrogen atom or a $C_1$–$C_{20}$ alkyl group; and
M represents a tungsten or molybdenum metal atom.

2. Supported tungsten-(VI)- or molybdenum-(VI)-based compound according to claim 1, where (P) is silica, alumina, titanium silicalite, zeolite, bauxite, pumex, clay, fossil meal, titania, zirconia, zinc oxide, tin oxide, or an alkaline earth oxide, carbonate, sulfate, phosphate.

3. Supported tungsten-(VI)- or molybdenum-(VI)-based compound according to claim 1, where Q is nitrogen, phosphorous, arsenic, or antimony.

4. Supported tungsten-(VI)- or molybdenum-(VI)-based compound according to claim 1, where (P) is the silica prepared either according to the traditional techniques or via sol-gel or P is alumina, n is 1 to 6, Q is nitrogen or phosphorus, and R, R' and R'' are the hydrogen atom or $C_1$–$C_{12}$ alkyl group.

5. Supported tungsten-(VI)- or molybdenum-(VI)-based compound according to claim 1, where the amount of tungsten-(VI) or molybdenum-(VI) metal present is from 0.003 to 2.7 mmols of metal per each gram of the supported tungsten-(VI)- or molybdenum-(VI)-based compounds.

6. Process for synthesizing the compound according to claim 1, which comprises reacting, at atmospheric pressure and at a temperature of from 0° C. to 100° C., an aqueous phase containing (a) hydrogen peroxide and (b) tungsten-(VI) or molybdenum-(VI) metal in its elemental state, or a tungsten-(VI) or molybdenum-(VI) derivative with an onium salt bound to the solid inorganic matrices.

7. Process according to claim 6, wherein the tungsten-(VI)- or molybdenum-(VI) derivative is an acid or its salt; an oxide, a mixed oxide, or an oxide-salt; an oxyacid; a naphthenate; a carbonylic derivative; a sulfide; or a chloride; and wherein the temperature is from 20° C. to 80° C.

8. Process according to claim 6, wherein the tungsten-(VI) or molybdenum-(VI) derivative is tungstic or molybdic acid or its corresponding alkali metal salt.

9. Process according to claim 6, wherein the onium salts have the general formula (II):

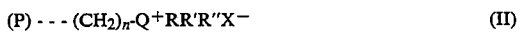

where
(P) represents a solid inorganic matrix;
n is 1 to 20;
Q represents a pentavalent element from Group VA of the Periodic Table;
R R', and R'', which may be the same or different, represent a hydrogen atom or a $C_1$–$C_{20}$ alkyl group; and
X represents a stable inorganic anion.

10. Process according to claim 9, wherein the onium salts are (3-aminopropyl)silica gel hydrochloride (3-aminopropyl)alumina hydrochloride, [3-(tributylammonio]propyl]silica gel chloride, or [3-(tributylphosphonio)propyl]silica gel chloride.

11. Process according to claim 6, wherein from 2 to 10 mol of hydrogen peroxide are used per each mol of tungsten-(VI) or molybdenum-(VI) derivative.

12. Process according to claim 6, wherein the onium salt is used in an amount corresponding to a molar ratio of $Q^+$/metal of from 3 to 0.1.

13. Process for synthesizing the compound of general formula (I) according to claim 1, which comprises reacting, at atmospheric pressure and a temperature of from 0° C. to 100° C., an aqueous phase containing hydrogen peroxide and a compound of general formula (III):

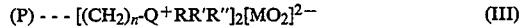

where (P) represents a solid inorganic matrix;
n is 1 to 20;
Q represents a pentavalent element from Group VA of the Periodic Table;
R, R', and R'', which may be the same or different, represent a hydrogen atom or a $C_1$–$C_{20}$ alkyl group;
and M represents a tungsten or molybdenum atom.

14. In a process for the heterogeneous oxidation of an organic substrate using hydrogen peroxide as the primary oxidizing agent, which process is carried out in a two phase aqueous/solid system, the improvement comprising carrying out the process in the presence of the supported tungsten-(VI)- or molybdenum-(VI)- based compounds of general formula (I) according to claim 1.

15. Process of claim 14, wherein the organic substrates are alcohol, diols, aldehydes, or ketones.

16. Process according to claim 14, wherein the compound of general formula (I) are used in an amount of from 0.0001 to 1 gram/atom of metal per 1 mol of hydrogen peroxide.

17. Process according to claim 9, wherein $X^-$ is $Cl^-$, $HSO_4^-$, or $NO_3^-$.

18. Process according to claim 15, wherein the compound of general formula (I) are used in an amount of from 0.0001 to 1 gram/atom of metal per 1 mol of hydrogen peroxide.

19. Process according to claim 14, wherein the oxidation is carried out in an aqueous phase and wherein the organic substrate is soluble in the aqueous phase.

20. Supported tungsten-(VI)- or molybdenum-(VI)-based compound according to claim 1, wherein Q is nitrogen phosphorus, arsenic, or antimony.

21. Process according to claim 11, wherein 2.5 to 6 mol of hydrogen peroxide are used.

22. Process according to claim 12, wherein the molar ratio of $Q^+$/metal is 2 to 0.25.

23. Process according to claim 13, wherein the temperature is from 20° C. to 80° C.

24. Process according to claim 16, wherein the amounts used are from 0.001 to 0.2 gram atom of metal per 1 mol of hydrogen peroxide.

25. Supported Tungsten-(VI)- or molybdenum-(VI)-based compound according to claim 1, wherein compound (I) is selected from the group consisting of silica - - - $[(CH_2)_3N^+H_3]_2[W_2O_{11}]^{2-}$, silica - - - $[(CH_2)_3N^+H_3]_2[Mo_2O_{11}]^{2-}$, silica - - - $[(CH_2)_3N^+butyl_3]_2[W_2O_{11}]^{2-}$, and silica - - - $[(CH_2)_3P^+butyl_3]_2[W_2O_{11}]_{2-}$.

26. Supported tungsten-(VI)- or molybdenum-(VI)-based compound according to claim 4, wherein compound (III) is silica - - - $[(CH_2)_3N^+H_3]_2[WO_4]^{2-}$.

* * * * *

UNITED STATES PATENT AND TRADEMARK OFFICE
CERTIFICATE OF CORRECTION

PATENT NO.  : 5,364,951
DATED       : November 15, 1994
INVENTOR(S) : Paolo Soncini et al.

It is certified that error appears in the above-identified patent and that said Letters Patent is hereby corrected as shown below:

On the title page, item [73]:
    Please change Assignee from "Eniricerche, S.p.A., Milan, Italy" to --Eniricerche, S.p.A. and Enichem, S.p.A., Milan, Italy--.

Signed and Sealed this

Tenth Day of October, 1995

Attest:

BRUCE LEHMAN

Attesting Officer

Commissioner of Patents and Trademarks